(12) United States Patent
Forrer et al.

(10) Patent No.: US 9,441,990 B2
(45) Date of Patent: Sep. 13, 2016

(54) CAPACITIVE ROTARY POSITION ENCODER

(71) Applicant: Leica Geosystems AG, Heerbrugg (CH)

(72) Inventors: Peter Forrer, Dozwil (CH); Siegfried Wiltsche, Wolfurt (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 107 days.

(21) Appl. No.: 14/326,362

(22) Filed: Jul. 8, 2014

(65) Prior Publication Data

US 2015/0015277 A1 Jan. 15, 2015

(30) Foreign Application Priority Data

Jul. 9, 2013 (EP) ..................................... 13175765

(51) Int. Cl.
*G01R 27/26* (2006.01)
*G01D 5/241* (2006.01)

(52) U.S. Cl.
CPC .................... *G01D 5/2415* (2013.01)

(58) Field of Classification Search
CPC . G01D 5/2415; G01D 11/245; G01D 4/2405
USPC .......... 324/658, 660–662, 679–684
See application file for complete search history.

(56) References Cited

U.S. PATENT DOCUMENTS

| 4,631,524 | A | * | 12/1986 | Brooke et al. .................. 341/11 |
| 5,736,865 | A | | 4/1998 | Nelson et al. |
| 8,587,328 | B2 | | 11/2013 | Martinez et al. |
| 2005/0110768 | A1 | | 5/2005 | Marriott et al. |
| 2006/0176189 | A1 | * | 8/2006 | Bar-On ..................... 340/870.37 |
| 2011/0050255 | A1 | | 3/2011 | Iriarte |
| 2012/0022828 | A1 | * | 1/2012 | Schneider et al. ............ 702/151 |

FOREIGN PATENT DOCUMENTS

| CA | 2 368 140 A1 | 10/2000 |
| CN | 1347493 A | 5/2002 |
| CN | 102798405 A | 11/2012 |
| EP | 2 270 433 A2 | 1/2011 |

(Continued)

OTHER PUBLICATIONS

European Search Report dated Dec. 19, 2013 as received in Application No. EP 13 17 5765.

*Primary Examiner* — Vincent Q Nguyen
(74) *Attorney, Agent, or Firm* — Maschoff Brennan (57) ABSTRACT

Some embodiments may include a capacitive rotary position encoder for the absolute determination of a rotary position about a rotary spindle. The rotary position encoder may include a transceiver unit, comprising a first arrangement of N electrically conductive, capacitive sensitivity areas which are embodied as angle segments over a defined angle range, which are distributed uniformly over the circumference, an electrically conductive reference area and an evaluation circuit, by means of which an electrical capacitance value between the reference area and one of the sensitivity areas is determinable. In some embodiments the sensitivity areas and the reference area are embodied as conductor track structures on a first electronics printed circuit board. A counterpart may be situated opposite the transceiver unit and rotatable relative thereto about the rotary spindle and may include a reference coupling area arranged opposite the reference area, and an arrangement of electrically conductive code areas connected thereto.

21 Claims, 7 Drawing Sheets

(56) References Cited

FOREIGN PATENT DOCUMENTS

| EP | 2527796 A2 | 11/2012 |
| GB | 2 118 720 A | 11/1983 |
| WO | 02/21081 A1 | 3/2002 |
| WO | 2008/083797 A8 | 7/2008 |
| WO | 2011/025812 A1 | 3/2011 |
| WO | 2011/025920 A1 | 7/2012 |
| WO | 2012/123351 A1 | 9/2012 |

* cited by examiner

CAPACITIVE ROTARY POSITION ENCODER

FIELD OF THE INVENTION

The invention relates to a capacitive rotary position encoder and to a method for capacitive rotary position determination.

BACKGROUND

The invention specifically relates to the technical field of capacitive rotary position encoders, in which the rotary position is determined with the aid of an overlap—varying with the rotary position—of electrically conductive areas—isolated with respect to one another by a dielectric—and the capacitance value between said areas, which varies in this case. The resulting capacitance value is proportional to the ratio of the area overlap in this case in accordance with a simplifying theoretical model.

In this case, in the rotary encoder, the areas can be rotated one above another contactlessly with an air gap as dielectric, as a result of which no mechanical wear of the sensor system occurs. Besides gases such as air, rotary encoders of this type can also be operated with liquid dielectrics, that is to say for example in water or oil. Alternatively, however, it is also possible to employ areas which are correspondingly insulated with respect to one another by solid dielectrics and which for example also slide on one another.

In order to obtain an absolute rotary position, it is necessary to provide an arrangement of capacitance areas which to enable an unambiguous, that is to say absolute, rotary position determination within the required measurement range, that is to say for example a full revolution. This can be achieved, for instance, by means of a non-rotationally symmetrical configuration of the capacitance ratios. For example with a plurality of capacitive sensitivity areas which are arranged in an annulus and over which sweeps a finger (human or embodied as an electrically conductive electrode) along the annulus, as is known for instance in the case of operating units of portable music players, for instance from US 2005/110768. However, in contrast to such operating units, the rotary position encoders dealt with here have a significantly higher precision and angle measuring accuracy of less than 1 degree, preferably even significantly below that—that is to say for instance in the range of 1/10 degree, 1/100 degree or below that.

Although, given corresponding geometric configuration of the capacitance areas, a linear or known dependence of the capacitance values on the rotary position can be achieved, a position determination of this type is also influenced by diverse disturbing influences (such as e.g. varying area distance, changes in the dielectric (for instance depending on air humidity, temperature), external electric fields, axial offset, non-parallelism of the areas, etc.).

Especially non-rotationally symmetrical arrangements manifest the disadvantage, however, that—especially if an accurate rotary position determination with high angular resolution is required—they are also sensitive to a variety of disturbing influences such as eccentricity, tilting, axial distance variations, wobble, and to external interference fields.

In this case, the "code" asymmetry introduced for the absolute rotary position encoding cannot be differentiated from possible other symmetry shifts as a result of error influences—which leads to measurement errors. In the case of rotationally symmetrical encoding from the prior art, as described for instance in U.S. Pat. No. 5,736,865, such problems can be reduced or avoided in a manner governed by the geometry, but absolute position information is no longer available in this case as a result of the symmetry.

In order to obtain accurate absolute position information, the number of sensitivity areas along the circumference could simply be increased, in order to obtain a higher angular resolution as a result of the smaller angular separation of said sensitivity areas. However, this is complex in practice, both in terms of the production of the position encoder and in terms of the signal evaluation. Standard electronic components for determining capacitance, specifically integrated circuits or IP cores for such circuits, which are manufactured in large numbers and are available in a correspondingly simple and inexpensive fashion, usually provide an evaluation of a limited number of channels, for example approximately up to 10, 12, 14, 16 or 20 channels. Components for evaluating a larger number of channels, for example 50 or more channels, are not available as standard, or require additional hardware outlay by virtue of multiplexer circuits or the like.

SUMMARY

Some embodiments of this invention may improve a capacitive rotary position encoder, specifically a rotary position encoder which is absolute-encoded over one revolution, in particular of a the rotary position with high angular accuracy in the range of less than 1 degree, preferably of 0.1 degree or below that.

Some embodiments may object is to provide a capacitive rotary position encoder which is absolute-encoded over one revolution and which resolves the rotary position with high angular accuracy in the range of less than 1 degree, preferably in an order of magnitude range of 0.1 degree or below that.

Some embodiments may of this invention is to provide a capacitive rotary position encoder which is embodied in such a way that frequent sources of error, such as eccentricity, wobble, tilting, changes in the ambient conditions, can be at least partly compensated for during the evaluation.

Some embodiments may be used for large-scale industrial producibility and also miniaturization and reduction of costs of the rotary position encoder.

Some embodiments may provide a capacitive encoder for absolute position determination which is producible with commercially customary electronic components available in high numbers and with standard processes that are routine in electronics production is also a further object of this invention.

Some embodiments may provide a corresponding evaluation method for highly accurate rotary position determination, in particular in the sub-angular degree range, in a capacitive rotary position sensor. In some embodiments a multiplicity of error and disturbing influences are intended to be compensated for or averaged out during the evaluation.

A capacitive rotary position encoder for the absolute determination of a rotary position about a rotary spindle is involved according to the invention.

This rotary encoder has a transceiver unit comprising
  a first arrangement of N electrically conductive, capacitive sensitivity areas which are embodied as angle segments over a defined angle range, in particular of approximately 360°/N (approximately since deducting technologically required distances between the angle segments—said distances being slight in relation to the angle segment widths, e.g. less than 20% of the angle segment widths—and/or within the meaning of possible production engineering tolerances), which are distributed uniformly over the circumference, an electrically conductive reference area, and an evaluation circuit, by means of which an electrical capacitance value between the reference area and one of the sensitivity areas is determinable.

In this case, the sensitivity areas and the reference areas are embodied as conductor track structures on a first electronics printed circuit board.

This rotary encoder furthermore has a counterpart situated opposite the transceiver unit and rotatable relative thereto about the rotary spindle and comprising a reference coupling area arranged opposite the reference area, and an arrangement of X≥3 electrically conductive code areas electrically connected thereto.

According to the invention, the code areas are embodied as angle segments with at least approximately the same defined angle range as the sensitivity areas and are arranged in a rotationally asymmetrical (or non-rotationally symmetrical) angular distribution about the rotary spindle.

To put it another way, an asymmetry is used according to the invention instead of the known symmetry for the error compensation of frequent sources of error, which asymmetry is embodied in such a way that an error compensation can likewise be carried out, but an absolute position determination is additionally made possible as a result.

This can be achieved according to the invention by virtue of the asymmetry being embodied in such a way that, despite this geometrical asymmetry, a symmetrical equilibrium of the detected measurement values is achieved, on the basis of which a compensation of errors can be carried out. In this case, the asymmetry makes it possible to determine the absolute value of the position, and the equilibrium ratios enable a numerical compensation of disturbing influences which would corrupt the rotary position determined.

One exemplary embodiment of a capacitive rotary position encoder according to the invention is explained below.

In this case, the rotary position encoder is equipped with a number of N capacitive sensitivity areas with which it is possible to determine in each case a capacitance value relative to (one of the other areas or) a reference area.

This determination of the capacitance values is effected by means of an electronic circuit, which can also be embodied completely or partly as an integrated circuit in a chip. By way of example, one possible principle of a capacitance measurement of this type is described in WO 2011/025812 or EP 2 470 919 or can be gathered from manufacturers' data sheets, such as, for example, that of the component "AD7142" from the manufacturer "Analog Devices" or similar components from the same or some other manufacturer. Integrated circuits of this type can already have internally a wide variety of compensation and referencing circuits in the capacitance determination, for example a calibration logic for changing ambient conditions such as temperature, air humidity, etc., or other calibration data for improving the capacitance measurement values determined.

In this embodiment, the capacitance determination is effected in each case between the sensitivity areas and a reference area, which is connected to an RF signal transmitter.

The sensitivity areas are arranged in a circular fashion— in the example shown in the form of segments of an annulus which in each case cover (within the scope of the manufacturing tolerances) angle segments of identical magnitude and are spaced apart from one another. In this case, the annulus segments can also be approximated in terms of their shape, e.g. trapezoidal.

The reference area is situated as a circle or annulus in the center of this sensitivity area annulus. Alternatively or additionally, the reference area could also enclose the sensitivity area annulus.

In this case, the sensitivity and reference areas can be embodied as conductor tracks or conductor areas of a printed circuit board, preferably in one of the outer layers but also in a protected manner in an inner layer (provided that the latter is left free of conductor tracks in this region at least on one side in the direction of the outer layer. For shielding purposes, a shielding area can be provided below the layer having the sensitivity and reference areas and/or in the plane thereof around them. The evaluation electronics can be arranged for example in a space-saving manner below the sensitivity areas, but also alongside them if this is advantageous in a manner governed by the application.

The above-described arrangement with the evaluation circuit can be designated as the "stator" of the rotary position encoder since the latter, by virtue of bearing the evaluation circuit, has to be electrically contact-connected. In many applications, said stator is preferably embodied as a stationary part of the rotary encoder. In this case, the terms rotor and stator are dependent on the reference system under consideration and can correspondingly also be employed in an interchanged manner in other embodiments.

During the evaluation, on account of the code arrangement, it is possible to compensate for a tilting, eccentricity of the spindles or of the mounting of the rotary encoder according to the invention. Beside or in addition to the compensation of these effects, the rotary encoder according to the invention can also be used to detect and quantify these effects, or to measure them as additional measurement values, in the way that these principles are described in WO 2008/083797 and are explained in use examples in PCT/EP2012/054095 or WO 02/21081, for example.

The associated rotary part, also designated as counterpart or "rotor", is accorded the task of coupling the signals from the reference area to the sensitivity areas in a rotary-position-dependent manner, such that an absolute rotary position of the rotor relative to the stator is determinable. In this case, the capacitive coupling can be effected entirely contactlessly, that is to say with a continuous air gap between stator and rotor. Besides air, other electrically non-conductive materials can also be situated between rotor and stator. Although a conductive coupling of the reference area to the rotor would fulfill the same function, electrical contacts between moving and stationary parts are usually disadvantageous with regard to the wear and reliability thereof, for which reason they are usually avoided.

In the embodiments illustrated below, the rotor is embodied in a disk-shaped fashion. In this case, the rotary spindle of the rotary position sensor passes at least approximately centrally through the arrangement of the coupling or reference areas. The disk shown has centrally a reference coupling areas which becomes situated above the reference area and preferably has approximately the same radial dimensioning. In the case of the above-described variant of a reference area situated on the outside on the stator, this opposite reference coupling area would correspondingly likewise be arranged on the outside, e.g. as an annulus.

This reference coupling area is connected radially outwardly (or in the other variant correspondingly inwardly) to code areas which couples the signal "received" capacitively from the reference coupling area to the sensitivity areas, such that capacitance values between the reference area and the sensitivity areas are determinable. To put it another way, in each case a series connection of the capacitance between the reference area of the stator and reference coupling areas of the rotor and the capacitance between a the code areas and the respectively adjacent sensitivity areas is determined.

In this case, the code areas shown are likewise embodied as circle segments, in particular since circle shapes are appropriate per se for rotative measurement systems. In this case, according to the invention, the division of said code areas around the circumference is not effected in a uniformly distributed manner, however, as is the case for the associated sensitivity areas shown, but rather with a non-rotationally symmetrical geometrical division.

As a result of this asymmetry, an absolute rotary position of the rotor relative to the stator can be determinable with the aid of the evaluation of the capacitance values—determined with the sensitivity areas. For this purpose, an arbitrary asymmetry of the code areas would be sufficient, that is to say for example including a single code area, such as e.g. in U.S. Pat. No. 5,736,865.

In order to achieve a higher angular resolution, an increase in the capacitance resolution of the capacitance value determination can now be employed. However, limits are imposed on such an extension of the measurement resolution by physical limits of the measuring circuit or simply by the measuring component used, and these limits imposed can be overcome only with high additional outlay. In particular the achievable SNR is ultimately crucial for the maximum achievable measurement accuracy and, starting from a certain threshold, said SNR can no longer be improved further by purely increasing the measurement resolution. Alternatively, a further increase in accuracy can be achieved for example by the reduction of the bandwidth accompanied by a longer measurement time and, if appropriate, averagings.

In order to be able to determine the rotary position with higher resolution for the same capacitance resolution (e.g. provided by the measuring component or measuring circuit used), the number of sensitivity areas can also be increased in order to carry out a more accurate position determination with the same amplitude resolution of the capacitance measurement.

According to the invention, an improved position resolution is achieved by virtue of the fact that, by means of the geometrical arrangement and configuration of the code areas and sensitivity areas, error terms can be averaged out of the resulting measurement signals of the capacitance values. However, this geometrical arrangement and configuration is nevertheless effected in an asymmetrical manner, such that absolute position information is also determinable. Said error terms which are determinable in this arrangement encompass not only deterministic errors, such as eccentricity, wobble, etc., but also of non-deterministic errors such as noise, external disturbing influences, etc. Since it is possible to achieve a symmetry in the measurement values despite the rotational asymmetry of the geometrical arrangement of the code areas, the deterministic errors are determinable. As a result of the multiple measurement value determination along the circumference, moreover, it is possible to achieve statistical improvements e.g. with regard to noise terms. An improvement of the rotary position determination can thus be achieved as a result of the improvement of the SNR in the rotary position determination that is achieved by means of these two effects.

The invention correspondingly also relates to a method for capacitive rotary position detection, which determines N capacitance values by capacitive coupling of a reference area to a reference coupling area and via $X \geq 3$ code areas conductively connected to said reference coupling area to a subset of N sensitivity areas. In this case, the N capacitance values between the reference area and the sensitivity areas are determined by an evaluation circuit by means of application of an RF signal to the reference area.

In this case, the reference area, the sensitivity areas and the evaluation circuit can be arranged on a transceiver unit embodied as an electronics printed circuit board.

The reference coupling area with the code areas can be arranged on a counterpart rotatable relative to the transceiver unit about a rotary spindle, which counterpart can be embodied in an electrically passive fashion and not in a manner conductively connected to the transceiver unit. By way of example, the counterpart can be embodied as an unpopulated electronics printed circuit board, on which the reference coupling area and the code areas are embodied as a conductor track structure. Alternatively, the counterpart can also be embodied as a stamped sheet-metal part with the contour of the reference coupling area and of the code areas.

In this case, the rotary position detection is carried out in an absolute fashion with a non-rotationally symmetrical angular distribution of the code areas. In this case, a determination and compensation of geometrical incorrect positions of the code areas with respect to the sensitivity areas are effected during the rotary position detection as described on the basis of symmetry properties of the capacitance ratios.

The method can be effected with a determination and compensation of geometrical incorrect positions of the code areas with respect to the sensitivity areas with a differential evaluation of the capacitance distribution resulting from the arrangement thereof. In the arrangement according to the invention, the signals of the sensitivity areas can be evaluated differentially, in particular, if in any arbitrary rotary position maximally one of the code areas overlaps maximally one of the sensitivity areas and upon a complete overlap of a sensitivity area a sensitivity area opposite the latter has no overlap.

The invention also encompasses a computer program product, stored on a data carrier or as hardwired logic, for performing a rotational angle determination with the aid of a number of N capacitance values of a capacitive rotary encoder as described here. This computer program product carries out an absolute rotational angle determination with a numerical compensation of geometrical incorrect positions in the rotary encoder on the basis of symmetry properties.

BRIEF DESCRIPTION OF THE DRAWINGS

The method according to the invention and the device according to the invention are described in greater detail purely by way of example below on the basis of specific exemplary embodiments illustrated schematically in the drawings, further advantages of the invention also being discussed. In this case, the figures shown should not be regarded as to scale. In the figures specifically.

DETAILED DESCRIPTION

Figure 1:
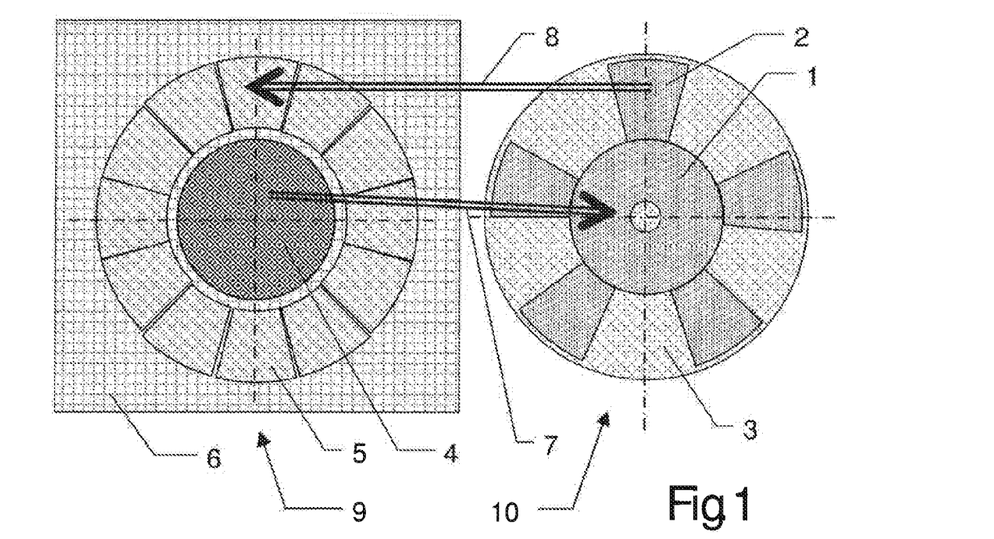
FIG. 1 shows a first exemplary illustration of components of one embodiment according to the invention of a rotary position encoder, wherein transceiver and counterpart are illustrated alongside one another.

FIG. 1 shows one embodiment of a capacitive rotary position encoder according to the invention for the absolute determination of a rotary position about a rotary spindle. This rotary position encoder has a transceiver unit 9, comprising a first arrangement of a number N of electrically conductive, capacitive sensitivity areas 5 which are embodied as angle segments over a defined angle range and which are distributed uniformly over the circumference. In this case, the defined angle range results in particular as approximately 360°/N, deducting the spacings between the sensitivity areas 5, said spacings being substantially negligibly small, in particular smaller than the angle ranges by orders of magnitude.

The transceiver unit 9 furthermore has an electrically conductive reference area 4 and an evaluation circuit, by means of which an electrical capacitance value between the reference area 4 and one of the sensitivity areas 5 is determinable.

The sensitivity areas 5 and the reference area 4 are in this case embodied as conductor track structures on a first electronics printed circuit board 6. The evaluation circuit can be embodied in the form of one or more electronic components mounted on the printed circuit board 6.

A counterpart 10 is arranged opposite the transceiver unit 9 and in a manner rotatable relative thereto about the rotary spindle. Said counterpart has a reference coupling area 1 arranged opposite the reference area 4, and an arrangement of $X \geq 3$ electrically conductive code areas 2 electrically connected to the reference coupling area 1. In this case, opposite specifically means that the planes of extent of the reference area 4 and of the reference coupling area 1 are at least approximately parallel. In this case, the planes of extent of the reference area 4 and of the reference coupling area 1 is also at least approximately orthogonal to the rotary spindle 13.

In this case, the code areas are embodied as angle segments with at least approximately the same defined angle range as the sensitivity areas and are arranged in a non-rotationally symmetrical angular distribution about the rotary spindle.

The transceiver unit 9 and the counterpart 10 are illustrated alongside one another in FIG. 1. The rotary spindle 13 is represented in each case by the cross of the axial lines illustrated, with the aid of which the non-rotationally symmetrical angular distribution of the code areas 2 is also readily apparent. For the rotational angle determination, the transceiver unit 9 and the counterpart 10 are arranged one above the other with an electrically nonconductive layer, preferably an air gap, between them, the axial crosses that are illustrated in each case at least approximately overlapping.

The term "at least approximately" in contexts above is taken to mean, in particular, deviations in the range of manufacturing tolerances, mounting tolerances or other inaccuracies which, in general, do not exceed a deviation of 20%, and usually are even significantly below that. Many of these deviations can also be compensated for with the aid of the present invention, as a result of which they influence the measurement result only insignificantly and are therefore indeed tolerable in the context of the invention.

In this case, the reference coupling area 1 and the code areas 2 can likewise be embodied as conductor track structures on a second electronics printed circuit board 6.

The capacitive couplings which are detected for the purpose of position determination are effected—symbolized by the arrow 7—from the reference area 4 via a dielectric, in particular across an air gap, toward the reference coupling area 1. The latter is connected to the code areas 5, which—symbolized by the arrow 8—are in turn capacitively coupled via a dielectric toward the sensitivity areas 5. By means of said sensitivity areas 5, the evaluation circuit determines in each case a capacitance value—via the path described—toward the reference area 4. In this case, the capacitance values are dependent on the rotary position of the code areas 2 relative to the sensitivity areas 5, to put it more precisely on the area overlap ratio thereof. Parasitic capacitive couplings that possibly occur, for example directly between the reference area 4 and the sensitivity areas 5, are not taken into account, for the sake of simplicity, in particular also because in the form of offsets or the like they can largely be determined and/or compensated for according to the invention.

Figure 2:
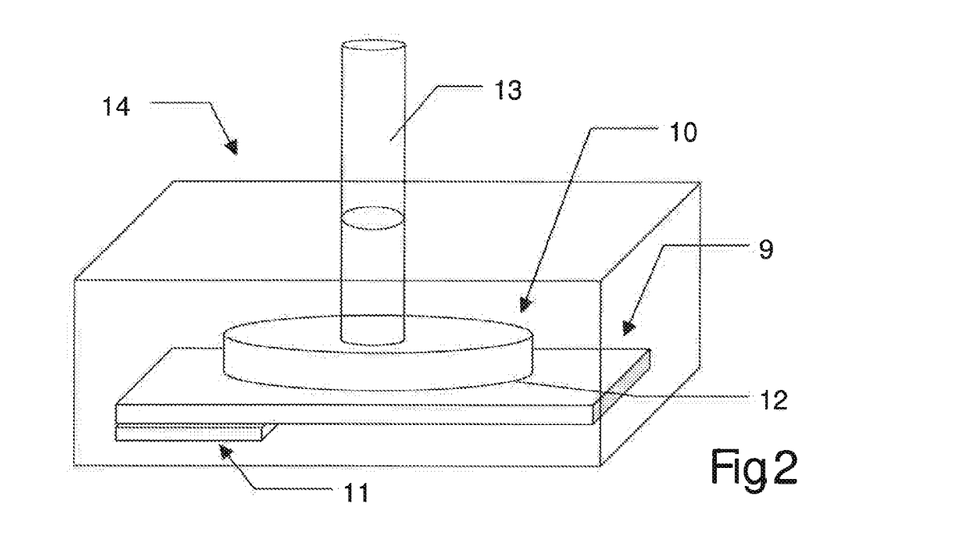
FIG. 2 shows a second exemplary embodiment of a rotary position encoder according to the invention in an assembled illustration.

FIG. 2 shows an assembled embodiment of a rotary position encoder 14 according to the invention, in which the counterpart 10 is arranged opposite the transceiver unit 9 in a manner rotatable about the rotary spindle 13. There is an air gap 12 present between these two elements. The counterpart 10 and the transceiver unit 9 therefore have no electrically conductive contact with one another. The counterpart is therefore embodied as an electronically passive element, in particular, which generates no actively no signals and has no active electronic components. In this case, the evaluation circuit 11 is shown on the underside of the printed circuit board 6, said underside being situated opposite the sensitivity areas 5, but in a different embodiment can also be fitted on the top side of the printed circuit board 6 of the transceiver unit 9.

Figure 3:
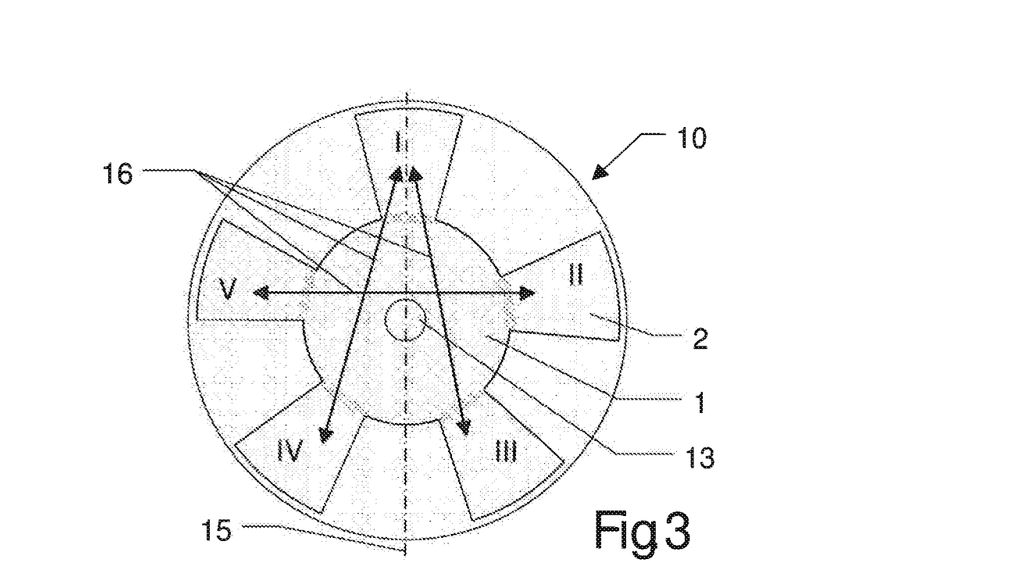
FIG. 3 shows an example of one embodiment according to the invention of a counterpart with reference coupling area and code areas.

FIG. 3 illustrates one exemplary embodiment of a counterpart 10. In this case, around the rotary spindle 13, the reference coupling area is illustrated concentrically illustrated as a circle or annulus area embodied with angle segments connected thereto and extending radially therebeyond, said angle segments forming the code areas 2. The non-rotationally symmetrical arrangement according to the invention of the code areas 2 around the reference coupling area 1 is clearly apparent here. Five code areas 2 designated by Roman numerals are formed in the example shown and in terms of their width all cover the same angle range, but vary in terms of their distances with respect to one another, that is to say are arranged non-rotationally symmetrically. With the aid of this non-rotationally symmetrical arrangement, an absolute rotary position of the counterpart 10 relative to the transceiver unit 9 can be determined by means of the sensitivity areas 5, on the basis of the capacitance values determined by means of the latter.

Symmetries of the code areas 2 with regard to their overlap with the associated sensitivity areas 5 nevertheless arise despite the non-rotationally symmetrical arrangement. Said symmetries are indicated by the arrows 16. The figure also shows a mirror symmetry about the diameter axis 15. With the aid of these symmetries it is possible to determine and/or compensate for errors in the rotary position determination.

The combination according to the invention of non-rotational symmetry and symmetry of the resulting capacitance ratios enables an accurate absolute and reliable position determination. In particular, in the latter in relation to the rotational resolution, only a small number of sensitivity areas 5 are evaluated.

In this case, the code areas 2 can specifically be arranged in such a way that in any arbitrary rotary position maximally a single one of the code areas 2 with one of the sensitivity areas 5 attains the maximum overlap thereof.

In particular, the arrangement of the code areas 2 can be chosen in this case in such a way that upon each of the maximum overlaps one of the sensitivity areas 5, which is diagonally opposite said maximum overlap, is overlapped in each case by no code area 2—that is to say detects a minimum capacitance value. The knowledge—thereby acquired—of maximum value and minimum value of the capacitance can be used for example for a calibration of the scaling of the capacitance values. By way of example, a differential evaluation of these two capacitance values can be effected, and/or it is possible to carry out an evaluation relative to the minimum value, maximum value or average value of the capacitance that is thus determinable. Moreover, further averagings, for example over a plurality of capacitance values, temporal averagings or statistical methods can thus also be applied.

In this case, the counterpart 10 can be embodied as a second electronics printed circuit board 3, on which the reference coupling area 1 and the code areas 2 are embodied as a conductor track structure. In this case, the conductor track structure can be embodied in particular as an integral conductor track area on the outer layer of the printed circuit board 3. A printed circuit board 3 of this type is producible in large numbers industrially and cost-effectively and with a high dimensional stability of the conductor track structures, e.g. approximately in the range of 1/10 mm or significantly below that. Moreover, printed circuit board materials such as FR4, for instance, are extremely mechanically stable and also have an advantageous thermal behavior.

The counterpart 10 can also be provided with conductor track structures on its side facing the transceiver unit 9 and on its side facing away from the transceiver unit 9, in particular with at least approximately the same conductor track structure on both sides. This affords advantages with regard to the mechanical warpage of the counterpart 10, especially under changing temperature and/or moisture influences. The production as a printed circuit board 3 having two outer layers is a standard process here, which enables cost-effective production. Possible drilling of a central centering hole 13 for a spindle receptacle is likewise a standard process in printed circuit board production.

If higher accuracies are required, the electronics printed circuit board can also be embodied in ceramic or glass, on which the conductor structure is coated. By way of example, customary methods such as screen printing, sputtering, vapor deposition, gas phase deposition, etc., with a possibly subsequent masking and etching process are appropriate for this purpose, which can likewise be carried out on an industrial scale and correspondingly cost-effectively.

Alternatively, the counterpart 10 can also be produced on an industrial scale as a stamped sheet-metal part with high dimensional accuracy simply and cost-effectively. In this case, only the contours of the reference coupling area with the code areas are stamped out and the angle ranges between the code areas can remain empty.

Figure 4:
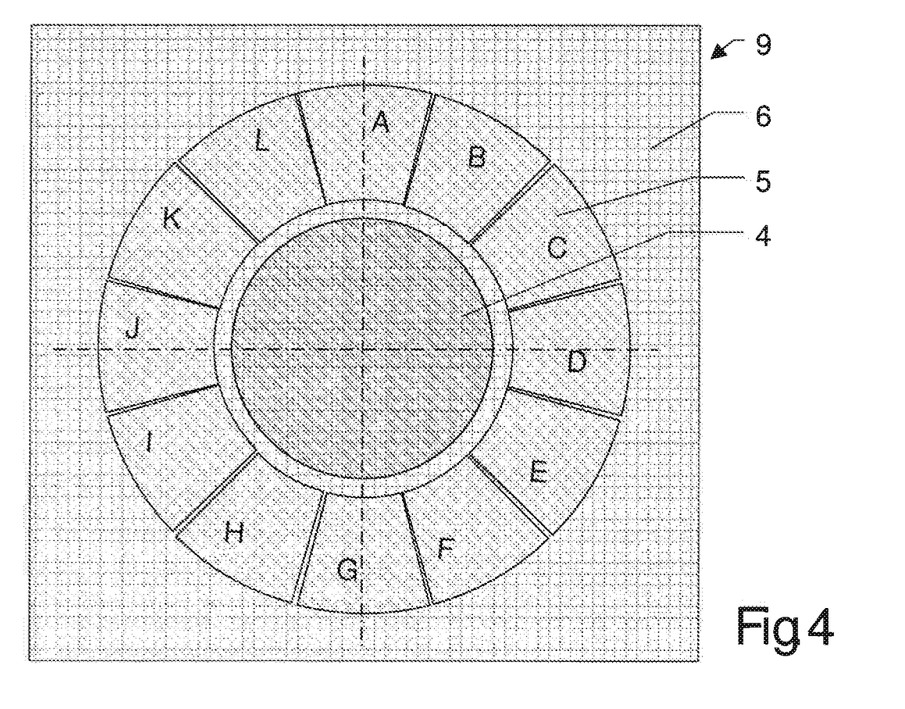
FIG. 4 shows an example of one embodiment according to the invention of a transceiver with reference area and sensitivity areas.

In the embodiment according to the invention of a transceiver unit 9 as shown in FIG. 4, the reference area 4 is embodied as a single, circular, central reference area 4. For the capacitance determination, an RF signal can be applied to this reference area 4 by the evaluation circuit 11 (not illustrated here). Said RF signal is then capacitively coupled to the counterpart 10—specifically via an air gap 12 to the reference coupling area 1 and via the code areas 2 of the counterpart 10, which are electrically conductively connected to the reference coupling area 1, back to the transceiver unit 9—to the sensitivity areas 5 thereof. With the N sensitivity areas 5—here designated consecutively by the Latin letters A to L—it is thus possible to determine N rotational-angle-dependent capacitance values with in each case one of the N sensitivity areas 5.

Said capacitance values are primarily dependent on the overlap ratios of the code areas 2 and sensitivity areas 5—as a result of which the rotary position is determinable. According to the invention, in this case, on account of the rotationally asymmetrical angular distribution of the code areas 2, it is possible to determine the rotary position as an absolute value. The arrangement of the code areas 2 and sensitivity areas 5 that is employed here can also be used, by means of the capacitance ratios arising in this case, to determine and compensate for secondary influences—not used for the primary rotational angle determination—on the capacitance values such as, for instance, geometrical incorrect positions such as axial offset, wobble, etc., but also ambient influences the external fields, temperature drift and air humidity drift.

Figure 5:
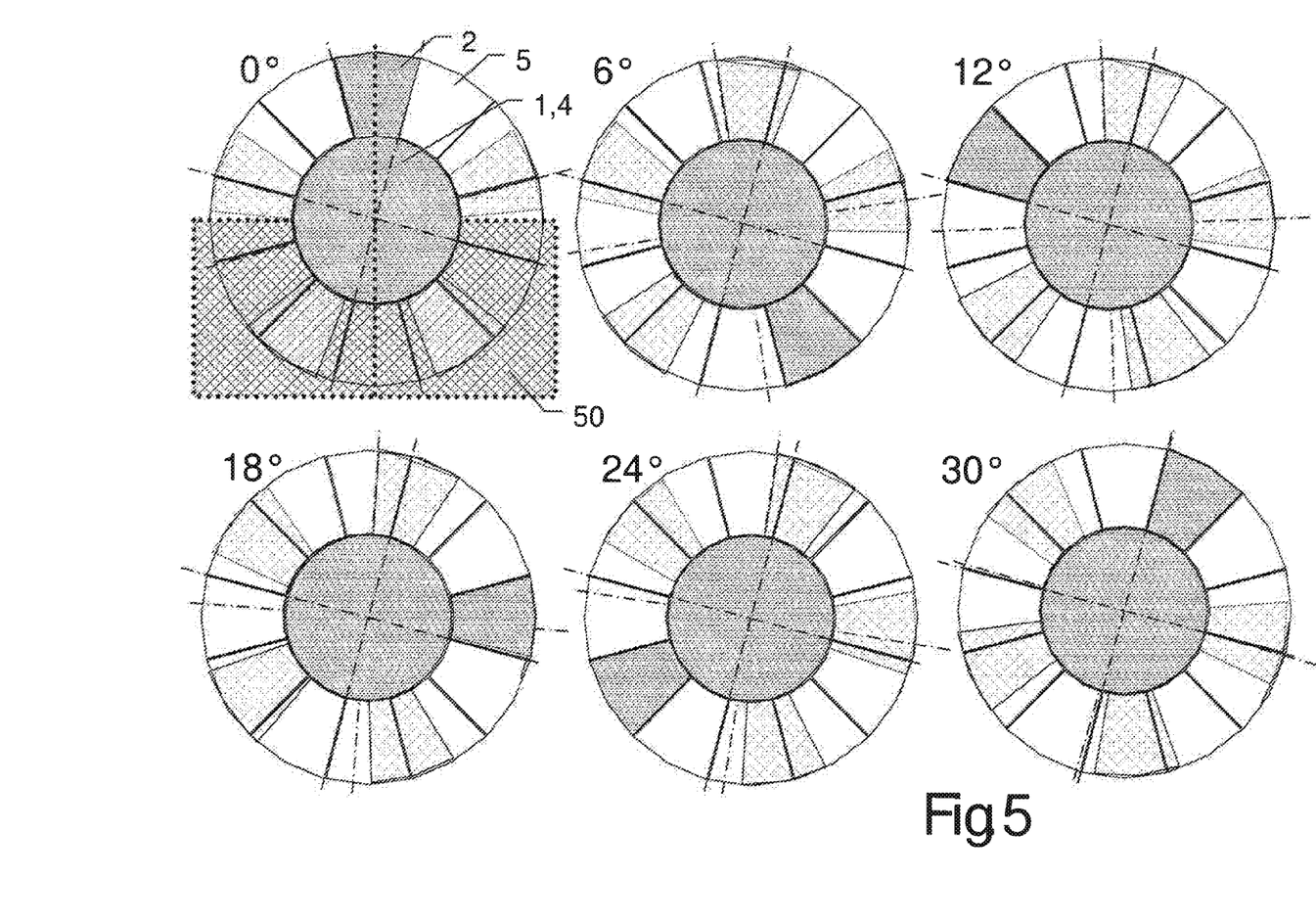
FIG. 5 shows an exemplary illustration of overlaps of code areas and sensitivity areas in a rotary position encoder according to the invention in different rotary positions.

With reference to FIG. 5, a specific embodiment with a general number of N capacitance measurement channels will now be described and explained in detail specifically on the basis of an exemplary example with 12 channels.

Given N capacitance measurement channels, N sensitivity areas 5—as a segmented annulus having N angle segments in the case shown—are present, which are all of the same size and are arranged in a manner offset by in each case 360 degrees/N (e.g. 360/12 degrees=30 degrees. The angle segments in this case—deducting a small distance between the sensitivity areas 5—are correspondingly also approximately 30 degrees wide. The reference area 4 is embodied as a solid circle in the center of the sensitivity areas 5.

The counterpart 10 to the transceiver unit 9 is illustrated in a superimposed manner with respect thereto. In this case, the angle segments of the sensitivity areas 5 are illustrated in a manner not filled in, whereas the angle segments of the code areas 2 are illustrated in a manner filled in semi-transparently. The reference receiving area 1 in the center, which has at least approximately the same area as the reference area 4, and the underlying reference area 4 are illustrated in a manner filled in more darkly. A complete overlap of a code area 2 with a sensitivity area 5 is also likewise filled in more darkly.

The code areas 2 are arranged around the reference receiving area 1. In this case, X=N/2−1 code areas 2 are present, which are all connected to the reference receiving area 1 and the external diameter of which approximately corresponds to that of the sensitivity areas 5.

In the example of 12 sensitivity areas 5, therefore, X=12/2−1=5 code areas 2 are present.

According to the invention, however, said X code areas 2 are not distributed uniformly over the circumference, as is the case for the sensitivity areas 5. The angular distribution of the code areas 2 is configured in such a way that in each case a maximum overlap of one of the code areas 2 with one of the sensitivity areas 5 occurs at a rotation angle separation of 360°/(N*X).

In this embodiment, the angular distribution of the code areas 2 is also configured in such a way that the angle separations between adjacent code areas 2 are varied in each case by 360°/N, or 0 plus a multiple of 360°/(N*X).

In particular, in this case a number N times X of maximum couplings of one of the code areas 2 to one of the sensitivity areas 5 occurs per full revolution, which are effected at rotational angles distributed uniformly over the circumference.

The rotational angle between in each case two areas can be chosen here as X*360 degrees/(0.5*N^2−N), where X is between (N−1) and (1.5*N−4).

In the example where N=12, therefore, the angular positions of the code areas 2 result as:
Area: Angle:

| | |
|---|---|
| I | 0 degrees |
| II | 78 degrees |
| III | 144 degrees |
| IV | 216 degrees |
| V | 282 degrees |

As a result of the non-uniform distribution of the code areas 2 over the circumference, it is possible to determine the rotary position over 360 degrees unambiguously, that is to say in an absolute fashion.

The arrangement of the code areas 2—that is to say the division of the interspaces between the code areas 2—is effected here in particular in such a way that the order of the complete overlaps of one of the code areas 2 with one of the sensitivity areas 5 upon a rotation of the counterpart 10 in one direction does not take place in a manner running circumferentially (or oppositely) with respect to this rotational direction. In this case, the arrangement of the code areas and the spacings thereof can be effected in such a way that the sequence or order of the maximum overlaps during a unidirectional rotation of the counterpart 10 relative to the transceiver unit 9 forms a succession in each case approximately opposite the previous overlap. Upon a rotation of the rotary encoder in one direction, therefore, a sequence of completely overlapped sensitivity areas which runs circumferentially in a circle does not arise. Upon such a rotation of the code areas 2 of the counterpart 10, successive complete overlaps of one of the sensitivity areas and one of the code areas therefore occur in each case approximately in a manner situated opposite. By way of example, a sensitivity area in each case overlaps completely which lies as far as possible in a region opposite the preceding complete overlap, that is to say for instance in the region 50 marked with respect to 0° in the figure, which region approximately encompasses the half 50 of the sensitivity areas which is opposite the overlap—that is to say in a region which is approximately diagonally opposite the preceding overlap. To put it another way, therefore, the code areas in this case can be arranged in such a way that upon a unidirectional change in the rotary positions of the rotary encoder a sequence of the maximum overlaps arises in which the maximum overlaps occur in a diagonally opposite region 50 relative to the respectively previous overlap, that is to say in particular the complete overlaps are effected with an angular separation of more than 45° or 90° with respect to one another.

This can be achieved with the rotational angle separations—determined according to the invention—between in each case two code areas 2 of the counterpart 10, as is illustrated in FIG. 5 in on the basis of one exemplary embodiment for a rotation of 0° to 30°. The optimum arrangement of these separations according to the present invention can also be verified and/or determined by a person skilled in the art by means of experiments or in the context of a simulation. Such an arrangement of the code areas 2 and sensitivity areas 5 contributes, in a rotary encoder according to the invention, to the fact that a multiplicity of position errors and other disturbing influences can be compensated for in the capacitance evaluation for the rotary position determination.

Relative to all the sensitivity areas 5, a full overlap of one of the sensitivity areas 5 and one of the code areas 2 is repeated in each case at an angular separation of 360 degrees/(N*(N/2−1)).

To put it another way, in the arrangement shown, it is necessary to determine the rotational angle separation about the rotary spindle between the maxima of the capacitance at one of the sensitivity areas 5 in accordance with this formula—that is to say given N=12 at 6 degrees—as is shown in the figure. However, the succession of the maximum overlaps does not necessarily run circumferentially in its sequence during a revolution, as is apparent in the example shown.

In each case opposite the sensitivity area 5 having the maximum overlap, said sensitivity area being illustrated dark, there is a sensitivity area 5 which is not overlapped by a code area 2 and thus has a minimum of the capacitance value. This enables, as a simple example, a differential evaluation of minima and maxima, as a result of which a possible common offset can be determined and/or compensated for. Upon consideration of the figure, even further differential or symmetrical properties of this embodiment of the code and sensitivity area arrangement according to the invention are evident, which can be used for a further improvement of position measurement values by averagings, maximum likelihood or statistical methods. However, the generic mathematical description thereof would formally prove to be too complex to be able to set it out in detail here.

In accordance with the capacitance ratios described above, the resolution of the capacitance measurement can be improved and, with the aid of an assessment of a plurality of sensitivity areas 5, the it is possible to determine the rotary position in an absolute fashion and with high positional precision and repeatability.

Figure 6:
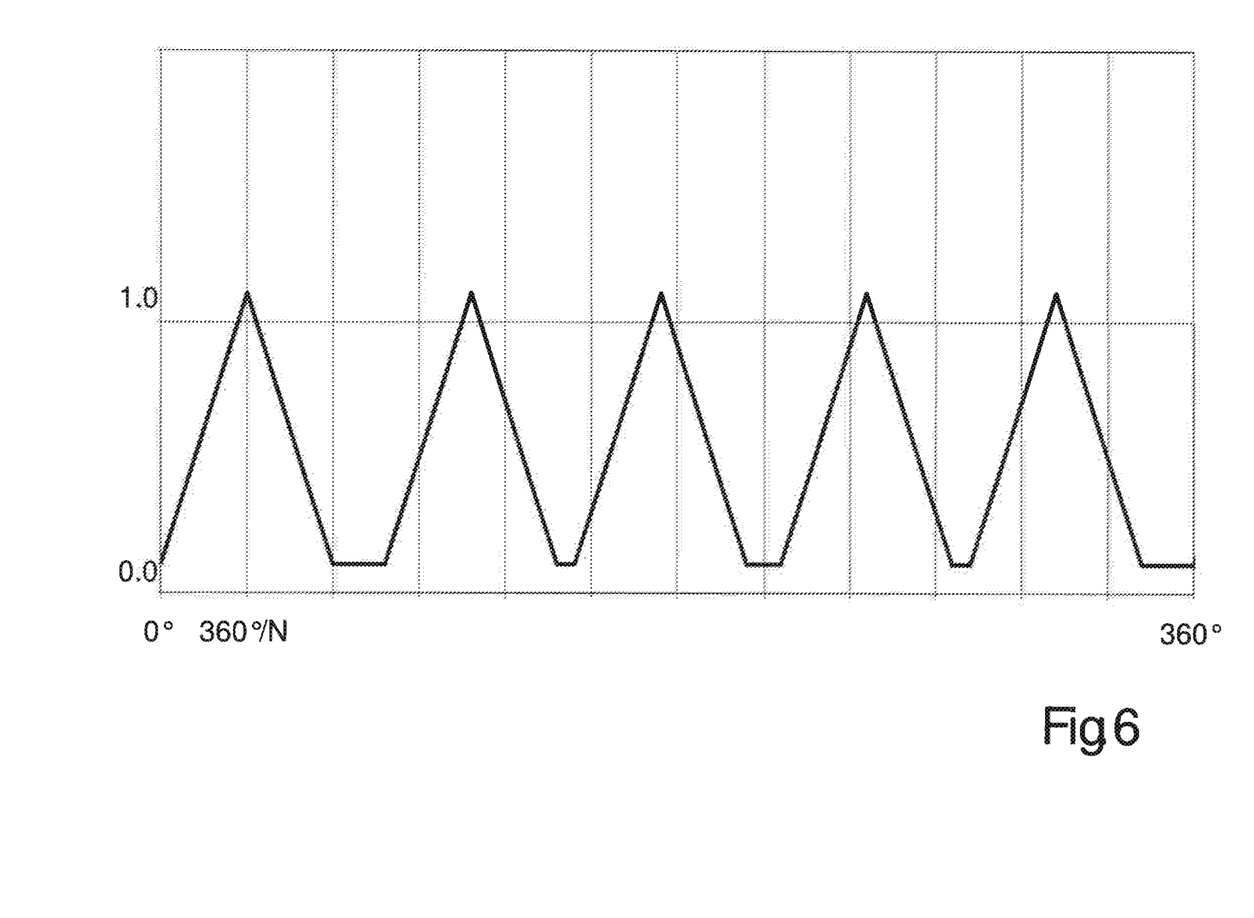
FIG. 6 shows an illustration of a profile of the capacitance value determined by one sensitivity area over one revolution with the aid of the exemplary embodiment from FIG. 3 and FIG. 4.

FIG. 6 illustrates a diagram of the capacitance value determined by means of one of the sensitivity areas 5 (or the area overlap—proportional thereto—of the sensitivity area with one of the code areas) over a whole revolution of 360°. The illustration reveals the different spacings of the X (in the example X=5) code areas 2 which sweep over this one sensitivity area 5 during the full revolution, on the basis of the angle range for which the value is at zero and at what angle the value is at one. The same shape of the signal peaks shown results from identical segment widths of all X code areas 5.

Figure 7:
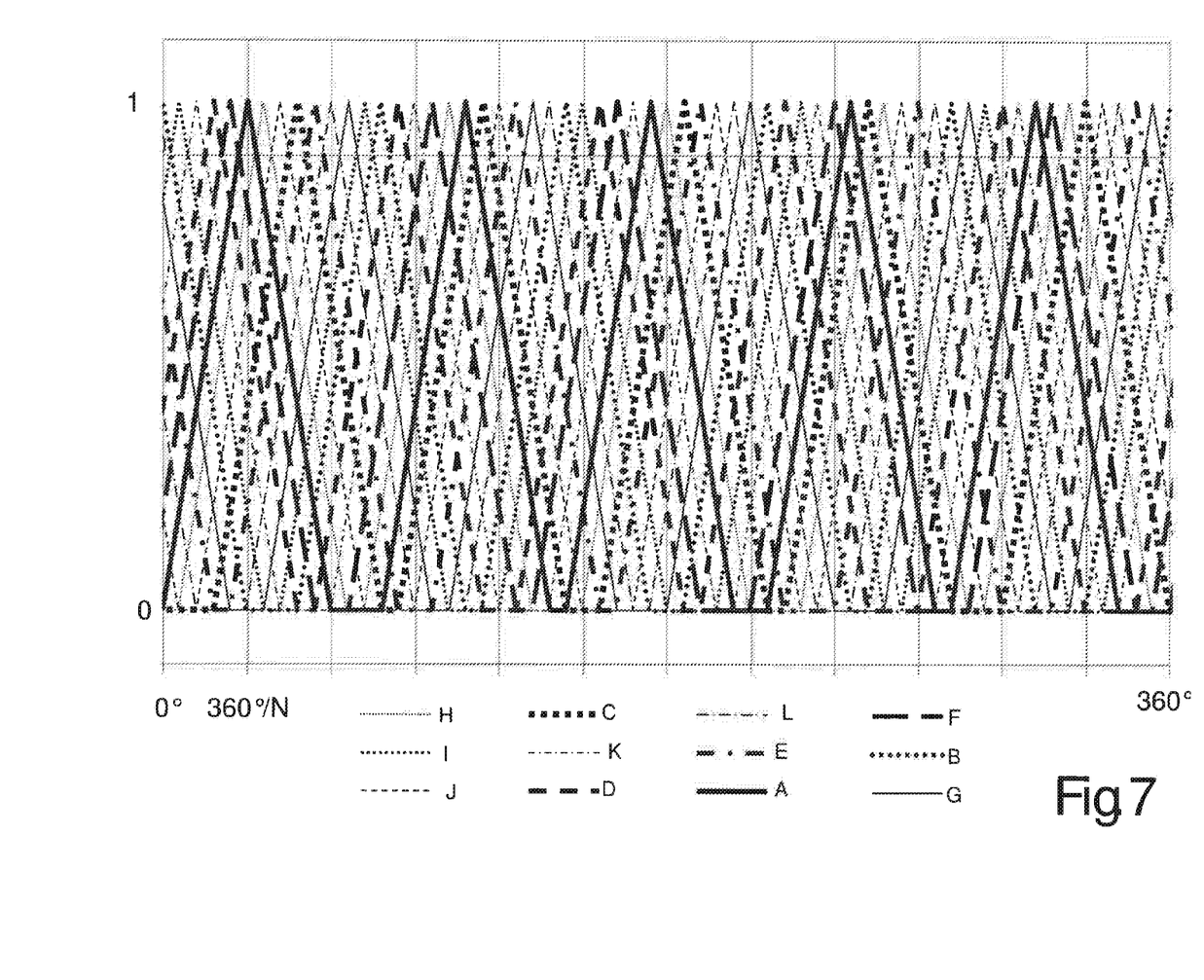
FIG. 7 shows an illustration of a profile of the capacitance values determined by all N sensitivity areas over one revolution with the aid of the exemplary embodiment from FIG. 3 and FIG. 4.

FIG. 7 illustrates a diagram with the signals of all twelve sensitivity areas 5 from the example—designated according to the scheme from FIG. 4. The illustration reveals the symmetry ratios according to the invention at every rotational angle, with the aid of which an improvement of the angle measurement value can be achieved according to the invention. Moreover, it is evident from this that every angular position can be determined unambiguously with the aid of these signals, which means an absolute encoding of the rotational angle of the counterpart 10 relative to the transceiver unit 9.

Figure 8:
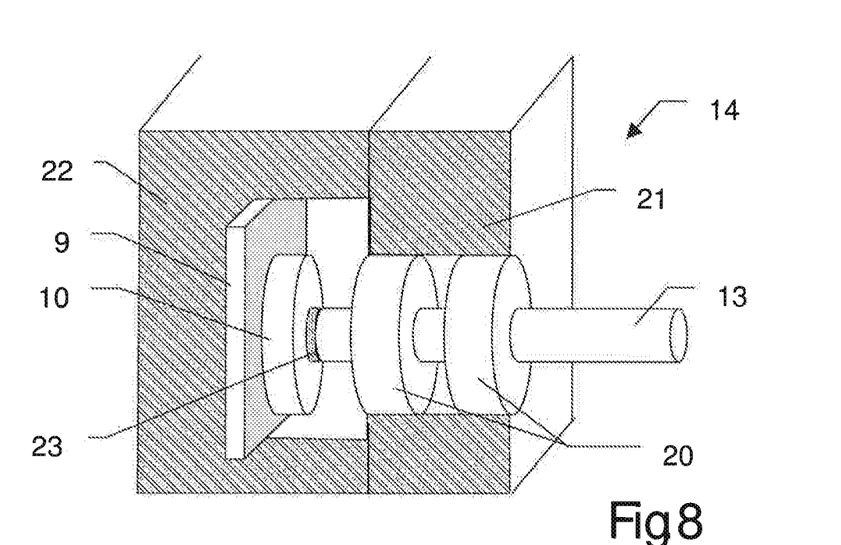
FIG. 8 shows one exemplary embodiment of a rotary position encoder according to the invention in a sectional illustration.

FIG. 8 shows an example of one embodiment according to the invention in which the counterpart 10 is fitted on a rotary spindle 13. The counterpart 10 can be fitted to the rotary spindle 13 for example by means of a flange 23, if appropriate with centering through a hole in the center of the counterpart 10. Moreover, the rotary spindle 13 can be inserted through a central hole in the counterpart 10 and adhesively bonded or soldered there. The rotary spindle 13 is mounted in a rotatable fashion by means of two bearings 20, wherein this mounting is embodied in a front part 21 of the rotary encoder, which can also be embodied as an external component with the rotary spindle 13, to which the rotary encoder for determining the rotary position is fitted. The transceiver unit 9 is fitted at a distance from the counterpart 10 in a rear part of the housing 22. Since geometrical incorrect positions of the transceiver unit 9 with respect to the counterpart 10 can be determined and compensated for according to the invention, the mounting of said transceiver unit and counterpart can be implemented with comparatively high dimensional tolerances, without at the same time incurring critical losses in the rotary position measurement accuracy.

Figure 9:
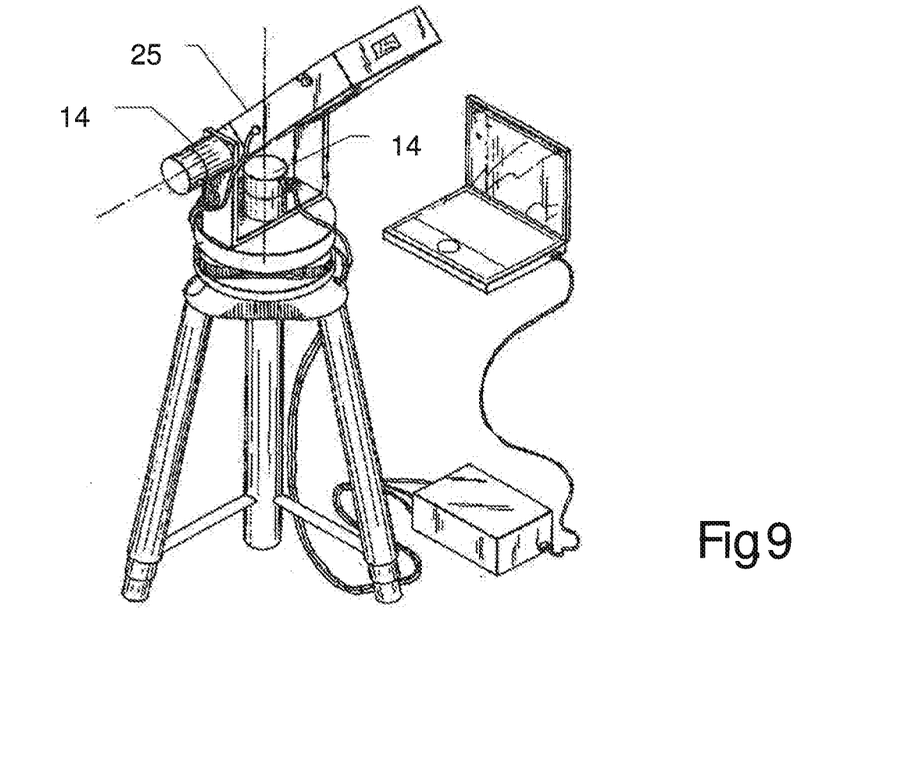
FIG. 9 shows a use example for the use of a rotary position encoder according to the invention.

FIG. 9 shows a use example in which a handheld, optoelectronic distance measuring device 25 is extended by means of two rotary encoders 14 according to the invention to form a 3D coordinate measuring machine, in order to carry out spatial measurements in polar coordinates. In a different use example, it is also possible to use only a single rotary encoder 14 for only one direction.

Figure 10:
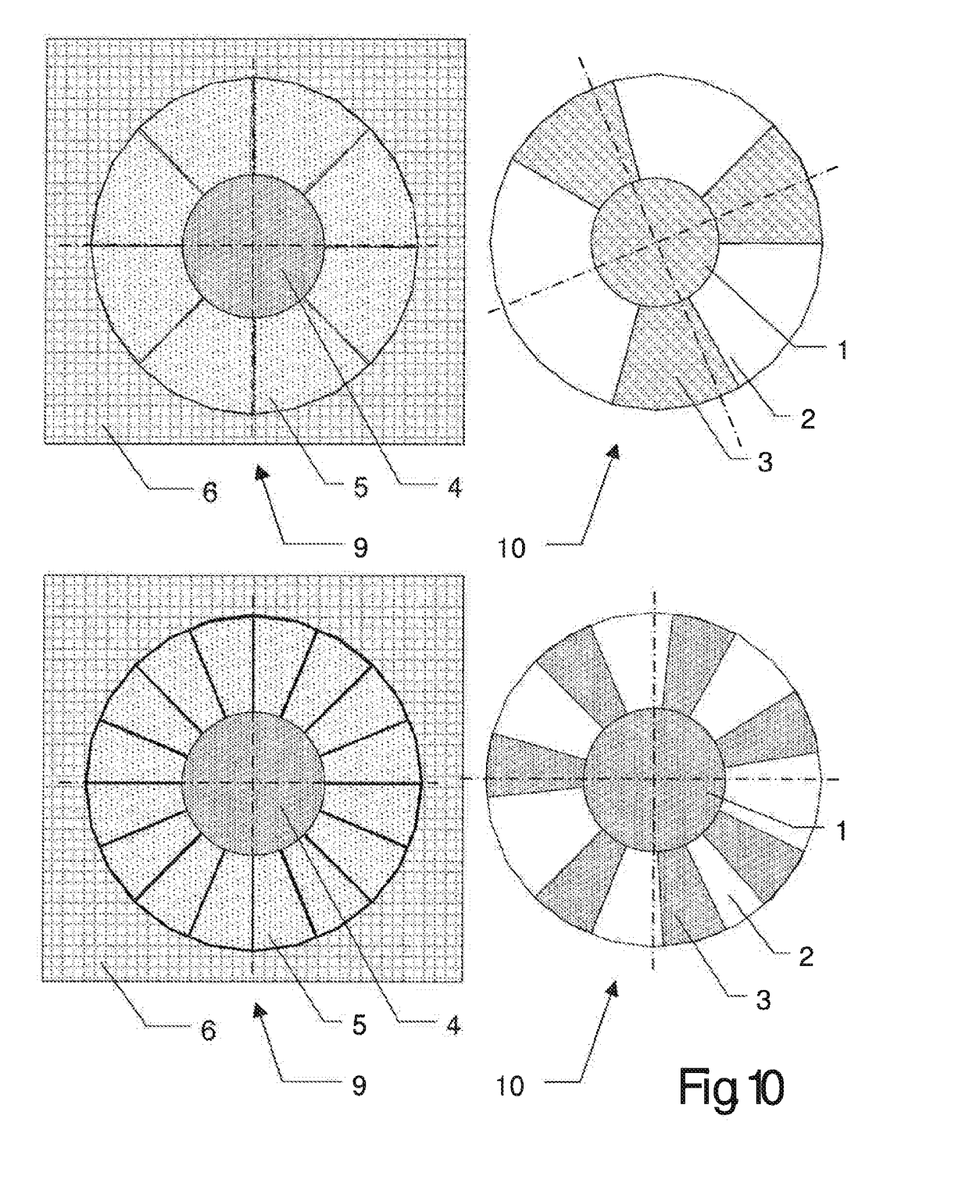
FIG. 10 shows exemplary illustrations of variants according to the invention of arrangements of sensitivity and code areas for a rotary position encoder according to the invention.

In the embodiments of rotary encoders 14 according to the invention as shown in FIG. 10, the number N of sensitivity areas 5 is not 12, but rather 8 and 16, and the number of code areas 2 is correspondingly not 5, but rather 3 and 7, respectively. The further aspects are embodied according to the invention as explained above.

In the exemplary embodiment illustrated above where N=8, the angular positions of the code areas 2 result—in accordance with the above explanations—as:

Area: Angle:

| | |
|---|---|
| I | 0° |
| II | 105° |
| III | 255° |

In the exemplary embodiment illustrated below where N=16, the angular positions of the code areas 2 result—in accordance with the above explanations—as:

Area: Angle:

| | |
|---|---|
| I | 0° |
| II | 51.4° |
| III | 112.9° |
| IV | 160.7° |
| V | 199.3° |
| VI | 257.1° |
| VII | 308.6° |

The rotary encoder according to the invention and the method used here can also be used in further fields of application, in particular in fields of application which require a correspondingly high and accurate rotary position resolution and high unit numbers low unit costs, for example as rotary encoders for electric motors, or the like. Besides rotary encoders, linear encoders could also be embodied analogously according to the concept according to the invention, in particular in the case of a restricted measurement range or in the case of a periodically repeating absolute encoding.

The symmetry principle of the rotary position encoder as set out here, said rotary position encoder being described here as capacitive, can also be applied to other sensor principles, e.g. magnetic or optical detection principles.

The invention claimed is:

1. A capacitive rotary position encoder for the absolute determination of a rotary position about a rotary spindle comprising:
    a transceiver unit, comprising:
        a first arrangement of a number of N electrically conductive, capacitive sensitivity areas which are embodied as angle segments over a defined angle range, which are distributed uniformly over the circumference,
        an electrically conductive reference area and
        an evaluation circuit, by means of which an electrical capacitance value between the reference area and one of the sensitivity areas is determinable,
    wherein the sensitivity areas and the reference area are embodied as conductor track structures on a first electronics printed circuit board, and
    a counterpart situated opposite the transceiver unit and rotatable relative thereto about the rotary spindle and comprising:
        a reference coupling area arranged opposite the reference area, and
        an arrangement of a number of X≥3 electrically conductive code areas electrically connected thereto, wherein:
            the code areas are embodied as angle segments having at least approximately the same defined angle range as the sensitivity areas and
            the code areas are arranged in a rotationally asymmetrical angular distribution about the rotary spindle.

2. The capacitive rotary position encoder according to claim 1, wherein the code areas are arranged in such a way that in any arbitrary rotary position maximally a single one of the code areas with one of the sensitivity areas attains the maximum overlap thereof.

3. The capacitive rotary position encoder according to claim 2, wherein the code areas are arranged in such a way that upon a unidirectional change in the rotary positions a sequence of the maximum overlaps arises in which the maximum overlaps occur in a diagonally opposite region relative to the respectively previous maximum overlap.

4. The capacitive rotary position encoder according to claim 2, wherein:
upon each of the maximum overlaps one of the sensitivity areas, which is diagonally opposite said maximum overlap, is overlapped by no code area, and/or
the code area arrangement is mirror-symmetrical with respect to at least one diameter axis.

5. The capacitive rotary position encoder according to claim 2, wherein the code areas are arranged in such a way that upon unidirectional rotation the maximum overlaps are effected with an angular separation of more than 45° or 90° with respect to one another.

6. The capacitive rotary position encoder according to claim 1, wherein the counterpart is embodied as a second electronics printed circuit board and the reference coupling area and the code areas are embodied as an integral conductor track structure thereon.

7. The capacitive rotary position encoder according to claim 6, wherein the counterpart is provided with at least approximately the same conductor track structure on its side facing and facing away from the transceiver unit.

8. The capacitive rotary position encoder according to claim 1, wherein the reference area is embodied as a single reference area, to which the evaluation circuit applies an RF signal which is capacitively coupled to the counterpart and from the latter via the code areas thereof to the sensitivity areas, such that N rotation-angle-dependent capacitance values between the reference area and in each case one of the N sensitivity areas are determinable.

9. The capacitive rotary position encoder according to claim 1, wherein the number X of code areas is $X=N/2-1$.

10. The capacitive rotary position encoder according to claim 1, wherein the code areas and the sensitivity areas have at least approximately the same geometry.

11. The capacitive rotary position encoder according to claim 1, wherein the angular distribution of the code areas is configured in such a way that in each case a maximum overlap of one of the code areas with one of the sensitivity areas occurs at a rotation angle separation of $360°/(N*X)$.

12. The capacitive rotary position encoder according to claim 1, wherein the angular distribution of the code areas is configured in such a way that the angle separations between adjacent code areas are varied in each case by $360°/N$, or 0 plus a multiple of $360°/(N*X)$.

13. The capacitive rotary position encoder according to claim 12, wherein a number of $(N*X)$ of maximum couplings of one of the code areas with one of the sensitivity areas occurs per revolution.

14. The capacitive rotary position encoder according to claim 1, wherein:
on the transceiver unit the number $N=12$ sensitivity areas are arranged as annulus segments with the angle range of $360°/N$ around the reference electrode embodied in a circular fashion, and
the number $X=5$ code areas with the angle range of $360°/N$ are arranged on the counterpart, said code areas being integrally connected to a central reference area coupling area embodied in a circular fashion.

15. The capacitive rotary position encoder according to claim 1, wherein the angle separations of the code areas with respect to one another are $360°/N+m*360°/(N*X)$, where $m=1 \ldots 3$.

16. The capacitive rotary position encoder according to claim 1, wherein defined angle range comprises approximately $360°/N$.

17. A method for capacitive rotary position detection comprising:
capacitive coupling of a reference area to a reference coupling area and via a number of $X>3$ code areas conductively coupled thereto to a subset of a number of N sensitivity areas,
wherein the number of N capacitance values between the reference area and the sensitivity areas are determined by an evaluation circuit by means of application of an RF signal to the reference area, and wherein:
the reference area with the sensitivity areas and with the evaluation circuit are arranged on a transceiver unit embodied as an electronics printed circuit board, and
the reference coupling area with the code areas are arranged on a counterpart rotatable relative to the transceiver unit about a rotary spindle, wherein the code areas are arranged in a rotationally asymmetrical angular distribution about the rotary spindle, wherein:
the rotary position detection is effected in an absolute fashion with a non-rotationally symmetrical angular distribution of the code areas on the counterpart.

18. The method for capacitive rotary position detection according to claim 17 further comprising compensating of geometrical incorrect positions of the code areas with respect to the sensitivity areas during the rotary position detection on the basis of symmetry properties.

19. The method according to claim 18, wherein the determination and compensation of geometrical incorrect positions of the code areas with respect to the sensitivity areas are effected with a differential evaluation of the capacitance distribution resulting from the arrangement thereof, in which arrangement in any arbitrary rotary position maximally one of the code areas maximally overlaps one of the sensitivity areas, wherein a sensitivity area situated opposite the complete overlap has no overlap.

20. A computer program product for performing a method of capacitive coupling of a reference area to a reference coupling area and via a number of $X>3$ code areas conductively coupled thereto to a subset of a number of N sensitivity areas,
wherein a number of N capacitance values between the reference area and the N sensitivity areas are determined by an evaluation circuit by means of application of an RF signal to the reference area, and wherein:
the reference area with the sensitivity areas and with the evaluation circuit are arranged on a transceiver unit embodied as an electronics printed circuit board, and
the reference coupling area with the code areas are arranged on a counterpart rotatable relative to the transceiver unit about a rotary spindle, wherein the code areas are arranged in a rotationally asymmetrical angular distribution about the rotary spindle, wherein:
the rotary position detection is effected in an absolute fashion with a non-rotationally symmetrical angular distribution of the code areas.

21. The computer program product according to claim 20, wherein the rotational angle determination carries out an absolute rotational angle determination with a numerical compensation of geometrical incorrect positions in the rotary encoder on the basis of symmetry properties capacitive encoding.

* * * * *